March 9, 1948.                D. KELLEHER                2,437,537
                               CLUTCH PLATE
                           Filed Feb. 27, 1946
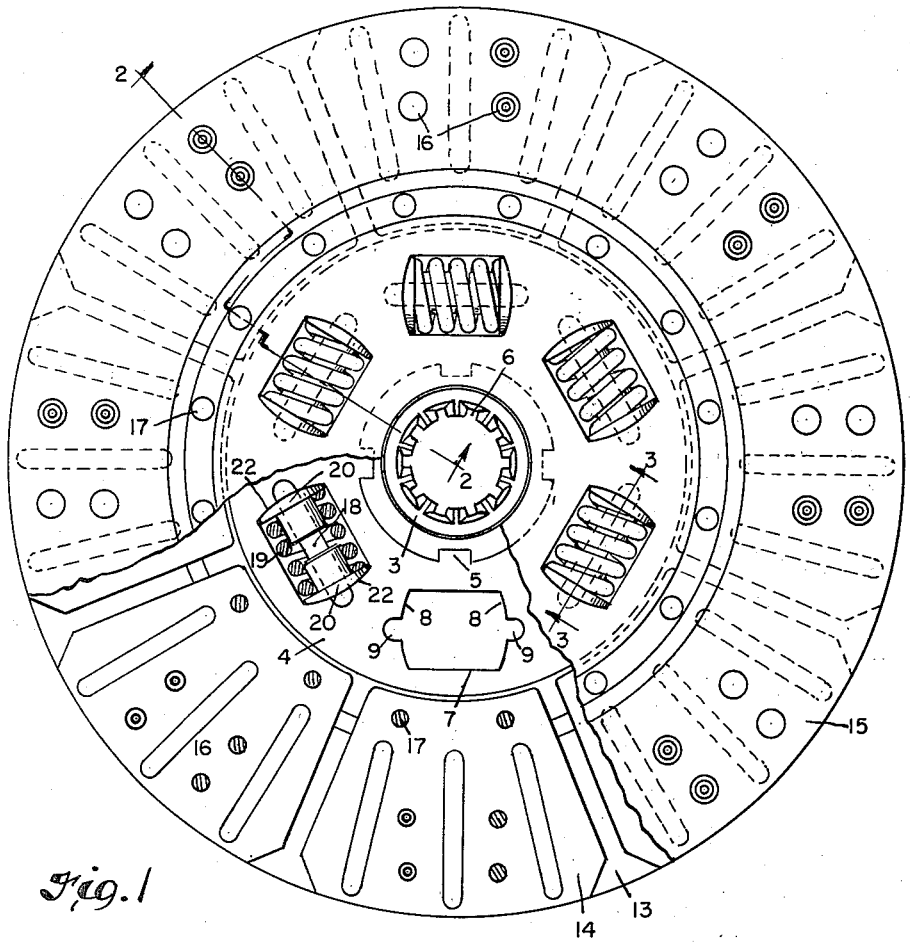
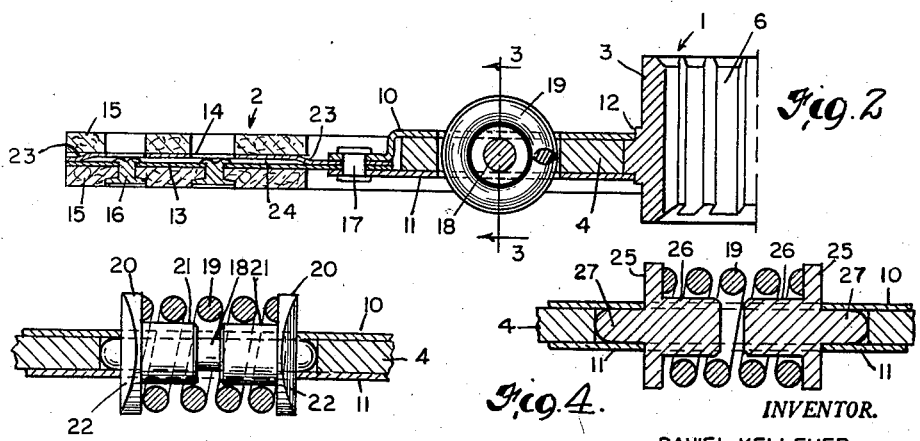
INVENTOR.
DANIEL KELLEHER
BY
Oberlin & Limbach
ATTORNEYS Patented Mar. 9, 1948

2,437,537

UNITED STATES PATENT OFFICE 2,437,537

CLUTCH PLATE

Daniel Kelleher, Berea, Ohio, assignor to
Ira Saks, Cleveland, Ohio

Application February 27, 1946, Serial No. 650,647

11 Claims. (Cl. 192—68)

The present invention relates to a torque transmitting device and more particularly to improvements in a clutch plate of the type commonly known as a coil spring cushion center plate wherein relative rotation or other movement of the two members thereof is yieldably resisted by coil springs disposed between the members. In such a clutch plate the coil springs are adapted to yieldably absorb the torque or forces transmitted from one member to another so that there is produced a resultant cushioning or dampening effect, thus eliminating sudden shocks and impacts from being transmitted through the clutch with which such plate is associated. In such plates now in general use, the coil springs are disposed between opposing walls of the two members and naturally if such walls are parallel to one another and perpendicular to the axes of the springs when the members are in their normal position relative to one another, such walls will not be so related to one another and to the springs when the members are caused to rotate relative to one another. Thus, the natural tendency of the springs to buckle or bend in the middle out of normal longitudinal straight line axial form when compressed is accentuated. Also, because the opposed walls of the members do not engage the entire end surfaces of the springs, there is excessive wear between the springs and the members, and such wear may cause damage to the springs and/or to the members. While such plates have been made with seating members engaging the entire ends of the springs, such seating members have not been constrained to move only longitudinally and co-axially of the springs. Therefore, it is one of the principal objects of this invention to provide means for retaining the springs in line to prevent cocking or buckling thereof.

Another object is to provide a structure wherein the entire end diameters of the springs are engaged by seating members.

Another object is to provide simple and efficient stops which are effective to limit compression of the springs.

Another object is to provide novel means for holding the springs and the seating members against lateral displacement without the use of guard or retaining lips or drawn recesses or the like.

Another object is to provide novel means for holding each seating member from rotating about its own axis.

Another object is to provide a structure wherein a wide variety of springs with regard to stiffness, wire size pitch and outer diameters may be used.

Another object is to provide novel means for slidably supporting the seating members.

Another object is to provide a structure having openings therein which are simple to manufacture as by piercing operations without the necessity of slitting and bending or drawing operations.

Another object is to provide a clutch plate which is light in weight to minimize the inertia or forces required to start and stop rotation thereof.

Another object is to provide novel means for permitting resilient relative movement of the clutch facings toward one another, for maintaining said facings flat and parallel to one another during such movement and for providing full flat area support for said facings during said relative movement and when the facing carrying members engage one another to limit further relative movement.

Additional objects and advantages of the invention will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In the drawing:

Fig. 1 is a plan view of a clutch plate embodying this invention;

Fig. 2 is a cross sectional view taken along line 2—2 of Fig. 1;

Fig. 3 is a cross sectional view taken along line 3—3 of Fig. 2; and

Fig. 4 is a cross sectional view similar to that of Fig. 3 except illustrating the modified form of cushioning means.

The clutch plate illustrated in the accompanying drawing comprises two members generally designated 1 and 2, which are mounted for rotation relative to one another. Member 1 includes a hub 3 which non-rotatably carries a flange 4. While for purposes of this invention the flange 4 could be made integral with hub 3, it is preferred that such parts be made separate, as shown. The non-rotatable connection between flange 4 and hub 3 may be effected, as by the inter-engaging teeth and key-ways 5 provided on such parts. It is also preferred that flange 4 be press fitted on to hub 3 so as to be non-slidable thereon. Hub 3 is provided with an internal spline 6 adapted to slidably but non-rotatably engage a shaft (not shown) to be driven by the clutch plate. Flange 4 is provided with a plurality of spaced openings 7 which are generally rectangular in cross section with cylindrical opposed end walls 8 and with recesses 9 in such opposed end walls. Openings 7 are clean cut holes through the flange 4 and may be formed as by a simple piercing operation.

Member 2, which is rotatable relative to hub 3 and flange 4, comprises spaced side plates 10 and 11 which overlap opposite sides of the flange 4 and preferably the side plates lie rather close thereto but not in binding engagement therewith. Side plates 10 and 11 have circular openings therethrough fitting over a circular portion 12 on the hub 3.

Attached to side plates 10 and 11 is a disc 13 and a plurality of cushioning segments 14. Clutch facing rings 15 of suitable friction material are attached to the disc 13 and to the cushioning segments 14 as by rivets 16. The cushioning segments 14 engage one facing 15 in flat surface contact throughout substantially its entire extent and the flat disc 13 engages the other facing 15 in the same manner. Each cushioning segment 14 includes outer and inner bent portions 23 in engagement with disc 13, thus providing an intermediate space 24. As the fly wheel and the pressure plate, not shown, are brought into engagement with the facings 15, the bent portions 23 will yield and flatten until ultimately the space 24 will be closed up thus providing a solid flat support for the entire extent of the facings 15. In yielding the cushioning segments 14 will remain flat and the facings 15 will in resiliently moving toward one another remain flat and parallel to one another and to the faces of the fly wheel and pressure plate. This assures uniform and even wear of the facings and provides for full area contact between the facings and the fly wheel and pressure plate.

Side plates 10 and 11 are provided with a plurality of spaced openings 7 in register with the above-described openings in the flange 4. The openings 7 in the side plates are preferably of the same size and shape as those in the flange 4 except that no recesses 9 are provided. Thus, the side plates 10 and 11 overlie the recesses 9 in flange 4. As in the case of the openings in the flange, the openings in the side plates are clean cut holes formed by a simple piercing operation.

Fitted into each pair of recesses 9 in flange 4 are the ends of a rod 18. The width of recesses 9 and the thickness of the flange 4 are substantially the same as the diameter of the rod 18. Thus, because the side plates 10 and 11 overlie the recesses 9, the rod 18 will be fixed in flange 4 against lateral movement relative to its own axis and such movement relative to the flange 4. Rod 18 is preferably of length equal to the distance between the extremities of the recesses 9 so that the rod 18 will also be fixed longitudinally of its axis.

Surrounding each rod 18 is a coil compression spring 19. Slidably mounted on each rod 18 are two seating members 20, each including a face engageable with one end of the spring 19 and a cylindrical face 22 engageable with the opposed wall portions 8 of the opening 7 in flange 4 and in side plates 10 and 11. Seating members 20 are of diameter slightly less than the radial width of the opening 7 for reasons which will become apparent as the description proceeds. The spring end engaging faces of each pair of seating members are parallel to one another and are perpendicular to the axis of the spring 19 therebetween and by virtue of the fact that seating members 20 are slide guided on a fixed rod, they can move toward and away from one another, maintaining said relation to one another and to the spring. Thus, in compressing the springs 19 and moving the pairs of seating members 20 toward one another, the natural tendency of the springs to buckle or bend in the middle will be eliminated.

Each seating member 20 includes a portion 21 extending into the spring 19 and fitted fairly closed therein. These portions 21 prevent displacement of spring 19 laterally of the seating members 20 and thus rod 18, seating members 20 and spring 19 are held in fixed relation laterally of the flange 4 and of each other. The aggregate lengths of the inwardly extending portions 21 of each pair of seating members is preferably greater than the solid compressed length of the spring 19 therebetween, whereby engagement of the end faces of said portions 21 with one another will operate as a safety stop to preclude the possibility of over-stressing the spring 19. As clearly shown in Figs. 1 and 3, the outer face 22 of each seating member 20 is shaped to correspond with wall portions 8 of the opening 7 in side plates 10 and 11 and in flange 4. When the parts are in the position shown, it can be readily seen that the engagement of the faces 22 with walls 8 prevents rotation of the seating members 20 about an axis coincident with that of rod 18.

While in the accompanying drawing the spring 19 is fairly large as compared with the opening 7, it is obvious that the seating member 20 can be variously modified to accommodate springs of various sizes.

When the side plates 10 and 11 and flange 4 and all of the other parts are in the position shown in Fig. 1, the springs 19 are preferably under compression. Now let us suppose that the facing rings 15 are frictionally engaged in driving relation with a drive member. In such case, rotation of member 2 will first effect compression of springs 19 and then rotation of member 1, thus causing walls 8 of the side plates 10 and 11 to move relative to the opposed walls 8 of flange 4. Such relative rotation, of course, continues until the torque transmitted through the springs 19 is sufficient to effect rotation of the driven member. Thereafter impacts, shocks and the like imparted to member 2 will be yieldingly cushioned or dampened by the springs 19 so that such impacts and shocks are not transmitted through the clutch from the driving member to the driven member or vice versa.

Because seating members 20 are constrained to move toward one another longitudinally of a fixed axis, the spring end engaging faces thereof will always be perpendicular to the axes of the springs 19. Also because the springs 19 are fixed against lateral displacement, there will be no chafing or contact between the openings 7 and the springs 19. Likewise, because the spring end engaging faces of the seating members 20 engage the entire ends of the springs and because they are fixed laterally relative to one another, there will be no rubbing or wear between the springs 19 and the seating members 20.

Another safety feature in addition to the safety stop aforesaid is the function of rod 18 in the event that a spring should break in preventing the separate pieces of the spring from falling off and causing serious damage to the clutch plate, fly wheel, pressure plate and other mechanism of the clutch.

The cushioning assembly illustrated in Fig. 4 comprises two seating members 25 engageable with the opposite ends of a spring 19. Each seating member is provided with a portion 26, the function of which is identical with the portion 21 of the seating member 20 shown in Figs. 1 and 3. In the assembly of Fig. 4 each seating member 25 is provided with a stem portion 27 slidable in the recesses 9 in flange 4. Because the stem portions 27 of each pair of seating members 25 are slide guided in recesses fixed relative to one another, the spring end engaging faces of the seating members will at all times be retained in parallel relation to one another even during movement of the seating members relative to one another. In this form the slide guided length of the stem portions 27 must exceed the distance between the ends of the stop portions 26 so that when such stops engage one another the stem portions will remain in slide guided engagement with the recesses 9.

While in the accompanying drawing there are shown six identical springs equally spaced, it is expected that any number could be provided and need not be equally spaced or include springs which are identical to one another. As a matter of fact, it may be desirable in certain cases to arrange the openings so that relative movement of the members 1 and 2 will compress one spring after the other until all of the springs are compressed.

Other modes of applying the principle of the invention may be employed, change being made as regards the details described, provided the features stated in any of the following claims or the equivalent of such be employed.

I therefore particularly point out and distinctly claim as my invention:

1. In a clutch plate or the like, a pair of members rotatable relative to one another provided with overlapping portions and opposed wall portions thereof defining a space of size depending on the positions of said members relative to one another, a spring in said space for transmitting torque between said members, a seating member having a face thereof engageable with one end of said spring and another face engageable with the wall portion of one of said members, and guide means associated with said seating member fixed relative to the other of said members.

2. In a clutch plate or the like, a pair of members rotatable relative to one another provided with overlapping portions and opposed wall portions thereof defining a space of size depending on the positions of said members relative to one another, a spring in said space for transmitting torque between said members, a seating member having a face thereof engageable with one end of said spring and another face engageable with the wall portion of one of said members, and guide means associated with said seating member fixed relative to the other of said members and effective when said members are rotated relative to one another to maintain said spring end engaging face of said seating member in predetermined planar relation to the wall portion of said other member.

3. In a clutch plate or the like, a pair of members rotatable relative to one another provided with overlapping portions and opposed wall portions thereof defining a space of size depending on the positions of said members relative to one another, a spring in said space for transmitting torque between said members, a seating member having a face thereof engageable with one end of said spring and another face engageable with the wall portion of one of said members, and a rod fixedly mounted in said other member, said seating member being slidably mounted on said rod.

4. In a clutch plate or the like, a pair of members rotatable relative to one another provided with overlapping portions and opposed wall portions thereof defining a space of size depending on the positions of said members relative to one another, a spring in said space for transmitting torque between said members, seating members for each end of said spring engageable with said opposed wall portions, and a rod fixedly mounted in one of said members, said seating members being slidably mounted on said rod.

5. In a torque transmitting device, a pair of overlapping members movable relative to one another provided with an opening therethrough, a spring in said opening, seating members in said opening engageable with the ends of said spring and with opposed walls of said opening, said opening in one of said members including a recess in each opposed wall portion thereof, portions of the other of said members overlying said recesses, and means associated with said seating members disposed in said recesses.

6. In a torque transmitting device, a pair of overlapping members movable relative to one another provided with an opening therethrough, a spring in said opening, seating members in said opening engageable with the ends of said spring and with opposed walls of said opening, said opening in one of said members including a recess in each opposed wall portion thereof, portions of the other of said members overlying said recesses, and means associated with said seating members disposed in said recesses for fixing said seating members laterally of said opening.

7. In a torque transmitting device, a pair of overlapping members movable relative to one another provided with an opening therethrough, a spring in said opening, seating members in said opening engageable with the end of said spring and with opposed walls of said opening, said opening in one of said members including a recess in each opposed wall portion thereof, portions of the other of said members overlying said recesses, and a rod slidably engaging said seating members having its ends disposed in said recesses.

8. In a clutch plate having a disc body and a flanged hub rotatably mounted with respect thereto and including overlapping portions, said overlapping portions including an opening therethrough, a spring in said opening, a rod within said spring fixed relative to said hub, and seating members slidable on said rod and engageable with the ends of said spring and with opposed wall portions of said opening.

9. In a clutch plate, a disc body, a hub provided with a flange, said disc body including spaced side plates overlapping opposite sides of said flange, said side plates and flange having an opening therethrough, a spring in said opening, seating members in said opening engaging the ends of said spring and opposed wall portions of said opening, and means fixed relative to said flange slidably engaging said seating members.

10. In a torque transmitting device, a pair of overlapping members movable relative to one another provided with an opening therethrough, a spring in said opening, seating members in said opening engageable with the ends of said spring and with opposed walls of said opening, said opening in one of said members including a recess in each opposed wall portion thereof, portions of the other of said members overlying said recesses, and each of said seating members including a stem portion slidable in one of said recesses.

11. In a clutch plate, a disc body, a hub provided with a flange, said disc body including spaced side plates overlapping opposite sides of said flange, said side plates and flange having an opening therethrough, a spring in said opening, seating members in said opening engaging the ends of said spring and opposed wall portions of said opening, said opening in said flange including a recess in each opposed wall portion thereof, portions of said side plates overlying said recesses, and a rod slidably engaging said seat members having its ends disposed in said recesses.

DANIEL KELLEHER.

REFERENCES CITED

The following references are of record in the file of this patent:

UNITED STATES PATENTS

| Number | Name | Date |
|---|---|---|
| 1,956,828 | Fink | May 1, 1934 |
| 2,008,169 | Blackmore et al. | July 16, 1935 |
| 2,186,653 | Penote | Jan. 9, 1940 |
| 2,309,950 | Goodwin | Feb. 2, 1943 |
| 2,321,941 | Rose | June 15, 1943 |